(12) United States Patent
Clark et al.

(10) Patent No.: US 6,788,263 B2
(45) Date of Patent: Sep. 7, 2004

(54) REPLACEABLE ANTENNAS FOR SUBSURFACE MONITORING APPARATUS

(75) Inventors: Brian Clark, Sugar Land, TX (US); John E. Edwards, Wattayah (NZ)

(73) Assignee: Schlumberger Technology Corporation, Sugar Land, TX (US)

( * ) Notice: Subject to any disclaimer, the term of this patent is extended or adjusted under 35 U.S.C. 154(b) by 60 days.

(21) Appl. No.: 10/261,032

(22) Filed: Sep. 30, 2002

(65) Prior Publication Data

US 2004/0060708 A1 Apr. 1, 2004

(51) Int. Cl.[7] .................................................. H01Q 1/04
(52) U.S. Cl. ........................ 343/719; 324/303; 324/338
(58) Field of Search ................... 343/719, 895, 343/709; 324/303, 300, 338, 333, 334, 332; 342/788; H01Q 1/04

(56) References Cited

U.S. PATENT DOCUMENTS

| | | |
|---|---|---|
| 4,689,572 A | 8/1987 | Clark |
| 4,704,581 A | 11/1987 | Clark |
| RE32,913 E | 4/1989 | Clark |
| 4,899,112 A | 2/1990 | Clark et al. |
| 4,949,045 A | 8/1990 | Clark et al. |
| 5,138,263 A | 8/1992 | Towle |
| 5,233,304 A | 8/1993 | Hubans |
| 5,467,823 A | 11/1995 | Babour |
| 5,530,358 A | 6/1996 | Wisler et al. |
| 5,642,051 A | 6/1997 | Babour et al. |
| 5,644,231 A | 7/1997 | Wignall |
| 5,939,885 A | 8/1999 | McClure et al. |
| 6,150,954 A | 11/2000 | Smith |
| 6,255,817 B1 * | 7/2001 | Poitzsch et al. ............ 324/303 |
| 6,351,127 B1 | 2/2002 | Rosthal et al. |
| 6,380,744 B1 | 4/2002 | Clark et al. |
| 2002/0008521 A1 | 1/2002 | Clark et al. |
| 2002/0079899 A1 | 6/2002 | Frey et al. |

* cited by examiner

Primary Examiner—Hoanganh Le
(74) Attorney, Agent, or Firm—Kevin P. McEnaney; Brigitte L. Echols; John J. Ryberg

(57) ABSTRACT

An antenna structure is separately and independently formed with respect to a tubular adapted for long-term disposal within a wellbore. The antenna is adapted for easy and rapid deployment on the tubular. An independently formed 'partial ring section' (or arcuate shaped member) contains an antenna coil. In one embodiment, one or more of the independently formed partial ring sections is placed on the exterior of the tubular to form a well completion. In another embodiment, a plurality of partial ring sections are coupled to a spooled cable for rapid deployment of the antennas onto a tubular in the field. Another embodiment includes partial ring sections forming an antenna with multiple coils of differing orientation to provide directional sensitivity.

42 Claims, 11 Drawing Sheets

REPLACEABLE ANTENNAS FOR SUBSURFACE MONITORING APPARATUS

BACKGROUND OF THE INVENTION

1. Field of the Invention

This invention relates to apparatus adapted for long-term subsurface disposal, such as wellbore tubulars and completion hardware, and, in particular, to replaceable and slide-on antennas for such apparatus. It is also applicable to electromagnetic telemetry used in subsurface communications.

2. Description of Related Art

Petroleum is usually produced from oil reservoirs sufficiently far below a gas cap and above an aquifer. As the oil zone is being produced and depleted, the gas cap starts coning downward and the aquifer coning upwards towards the oil-bearing zone. Such migration can adversely affect the extraction of petroleum by creating pockets that are missed by the producer and by saturating the oil deposits with water. As soon as either gas or water hits the well, its oil production usually ceases instantly.

FIG. 1a shows a deviated wellbore 70 drilled in an earth formation for the purpose of withdrawing oil from the reservoir. If conditions were perfect and the formation was homogeneous and isotropic, the interface between the oil and the water (i.e. the oil-water contact) would rise uniformly as the oil is depleted. In this case, the maximum amount of oil is produced before the onset of water production. However, in reality, this may not occur because of variations in formation properties along the horizontal wellbore, such as formation permeability, or fractures in the formation. FIG. 1b shows how water sometimes forces itself up, as shown by the water 'cone' 72, adjacent the deviated wellbore 70. Since water has a lower viscosity than oil, the water in the cone will flow into the deviated wellbore 70 over the oil along the deviated wellbore. Reservoirs are monitored for changes in saturation and early signatures of coning so that corrective action can be taken.

One approach to surveying and monitoring a reservoir is to deploy electrodes on the exterior of the casing. U.S. Pat. No. 5,642,051 (assigned to the present assignee) describes a casing, which has external insulation, electrodes, and cables for use in the completion. With such sensors mounted on the tubular, subsurface information such as reservoir pressure, temperature, flow rates, fluid fractions, sand detection, and chemical properties is acquired. These long-term/permanently installed monitoring systems have been developed to facilitate efficient reservoir management, well planning and resource exploitation. Wellbore apparatus for long-term monitoring are commercially available from companies such as ROXAR™ (information available at http://www.roxar.com).

Downhole techniques have also been proposed utilizing slotted tubes or liners. A liner is a specialized tubular used in a completion method to prevent the wellbore from collapsing, and may also be used to prevent sand grains and other small particles from entering the wellbore and forming debris piles, which may restrict fluid flow. A liner is most often used in a horizontal well and within a single producing formation. It is an alternative to leaving the hole completely open (i.e., with no casing), when an open hole may collapse or become blocked with debris. See James J. Smolen, *Production Logging In Horizontal Wells*, SPWLA THIRTY-FIFTH ANNUAL SYMPOSIUM, workshop notes, Tulsa, Okla., Jun. 19, 1994.

Cross-well monitoring is another approach to monitoring changes in reservoir saturation. This technique is an outgrowth of radar experiments conducted in the early 1970s. See Michael Wilt, *Exploring Oil Fields with Crosshole Electromagnetic Induction*, SCIENCE AND TECHNOLOGY REVIEW, August 1996; See also Q. Zhou et al., *Reservoir Monitoring with Interwell Electromagnetic Imaging*, SPWLA FORTIETH ANNUAL LOGGING SYMPOSIUM, May 30–Jun. 3, 1999. With this technique, a transmitter is deployed in one well and a receiver is deployed in a second well. At the receiver borehole, the receiver detects components of the transmitted and induced currents for determination of the reservoir characteristics between the wells.

Measuring the electrical resistivity near a borehole has long been used to determine production zones in oil and gas fields and to map sand and shale layers. The electrical resistivity depends directly on porosity, pore-fluid resistivity, and saturation. Porous formations having high resistivity generally indicate the presence of hydrocarbons, while low-resistivity formations are generally water saturated. The resistivity measurement is made by emitting, from a transmitter antenna, electromagnetic energy that propagates through the formation. A receiver antenna receives the electromagnetic energy propagating in the formation and, responsive thereto, the phase and the amplitude of the electromagnetic energy are measured. When two receivers are employed, the phase shift and attenuation of the electromagnetic energy are measured between the receivers and the resistivity of the formation is deduced from the aforementioned phase shift and attenuation. In common practice, most resistivity tools use electromagnetic energy in the frequency range of hundreds of kilohertz to a few megahertz. A typical distance between a transmitter and receiver is generally less than one meter because of the high rate of attenuation of high frequency electromagnetic waves in many subsurface formations.

Electromagnetic energy is also used for short-range communication between downhole systems when it is difficult to establish a direct-wired connection. Electromagnetic signals between antennas placed on subsurface apparatus are used to relay data along the system. An apparatus using such a technique is described in U.S. Pat. No. 6,057,784. The antennas used for these communication techniques are generally of the type used for measuring formation resistivity. However, typical frequencies used in downhole electromagnetic telemetry systems tend to be in the range of a few kilohertz to tens of kilohertz. The lower frequencies are required to transmit electromagnetic energy distances of tens of meters between the downhole tools. The higher frequency electromagnetic energy used in most resistivity tools might be too attenuated in low resistivity formations. Hence, details of the low frequency antennas (such as the number of turns) can be different from the high frequency antennas.

Typical downhole tool antennas consist of coils of the cylindrical solenoid type comprised of one or more turns of insulated conductor wire. These antennas are mounted on a support and axially spaced from each other in the direction of the wellbore. Conventional techniques for placing the loop antennas on the support involve wrapping the coil windings around the support. U.S. Pat. No. 4,949,045 (assigned to the present assignee) further describes the assembly and implementation of conventional antennas on while-drilling apparatus. Other resistivity measurement techniques implemented with cased wellbores involve disposing the antennas on run-in tools which are disposed through the casing so that the antennas align with slots in the casing. These techniques are described in published U.S. patent application Ser. No. 2002/0079899 A1 (assigned to the present assignee and incorporated herein by reference).

A completion is typically made up of a large number of tubular sections. The tubulars (e.g. liners and casing) are generally metallic. However, fiberglass and other nonmetallic tubulars have recently been implemented for well completions. The length of a single completion section is typically 30 to 40 feet. Hence, a 3000-foot long completion might have 100 such tubular sections, which are threaded together as the completion is tripped into the well. If the antennas are wound directly on the completion, many electrical connections will have to be made at the rig when running the completion into the well. Other disadvantages to directly winding the antennas on the completion are the cost and time consumption in the manufacturing process. The completion is sent to a specialty shop to wind the coils and over-mold them with rubber. Shipping and handling 30 to 40 foot sections of completion with integral antennas is also difficult and not amenable to local manufacture.

Thus a need remains for techniques for constructing antennas separately and independently from completion apparatus and for deploying these antennas on the apparatus, preferably at the field.

SUMMARY OF THE INVENTION

The invention provides a wellbore apparatus. The apparatus includes an elongated tubular adapted for long-term disposal within the wellbore; at least one arcuate shaped member adapted to function as an antenna and for disposal on the tubular, the arcuate shaped member being independently formed with respect to the tubular; and each at least one arcuate shaped member having a coil disposed therein.

The invention provides a method of deploying an antenna on a tubular adapted for long-term disposal in a wellbore. The method includes disposing an arcuate shaped member on the exterior of the tubular, the arcuate shaped member being independently formed with respect to the tubular and including a coil disposed therein; and coupling an electrical source to the coil.

The invention provides a system for deployment of antennas within a wellbore, the antennas adapted to transmit or receive electromagnetic energy. The system includes an electrical cable having the antennas coupled thereto; a tubular adapted for disposal within the wellbore and to receive each of the antennas; wherein each of the antennas comprises an arcuate shaped member independently formed with respect to the tubular; and each arcuate shaped member having a coil disposed therein.

The invention provides a method for deploying antennas within a wellbore, the antennas adapted to transmit or receive electromagnetic energy. The method includes mounting each of the antennas along a tubular adapted for disposal within the wellbore, each antenna being coupled to an electrical cable and comprising an arcuate shaped member independently formed with respect to the tubular, each arcuate shaped member having a coil disposed therein; and disposing the tubular within the wellbore.

DETAILED DESCRIPTION

Figure 2D:
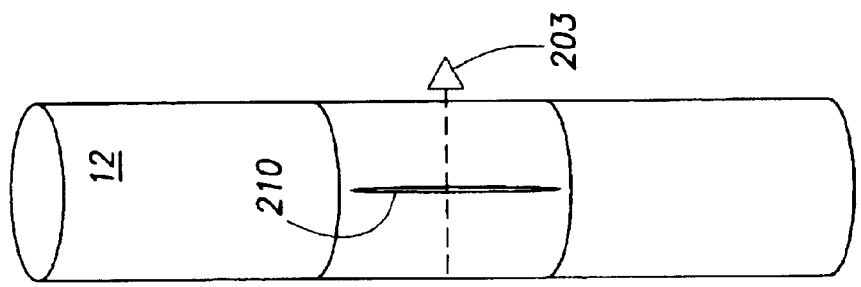
FIGS. 2a–2d illustrate conventional antenna configurations used on wellbore tubulars. Axial, diagonal, and transverse configurations are respectively shown.
Figure 2C:
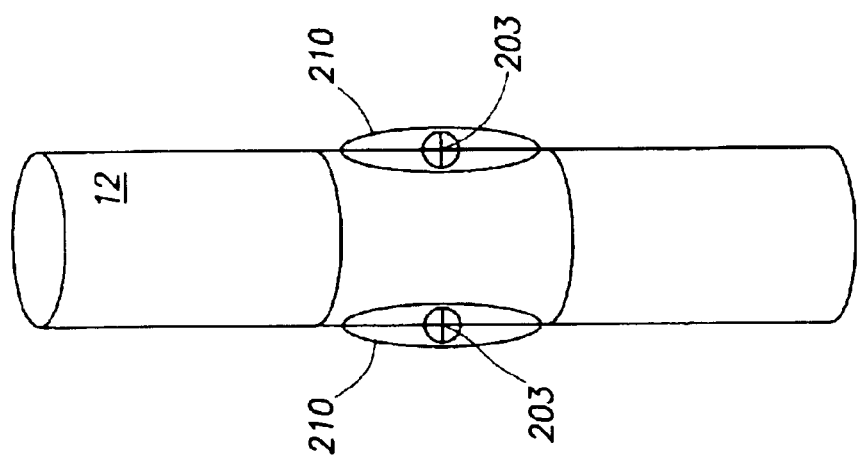
Figure 2B:
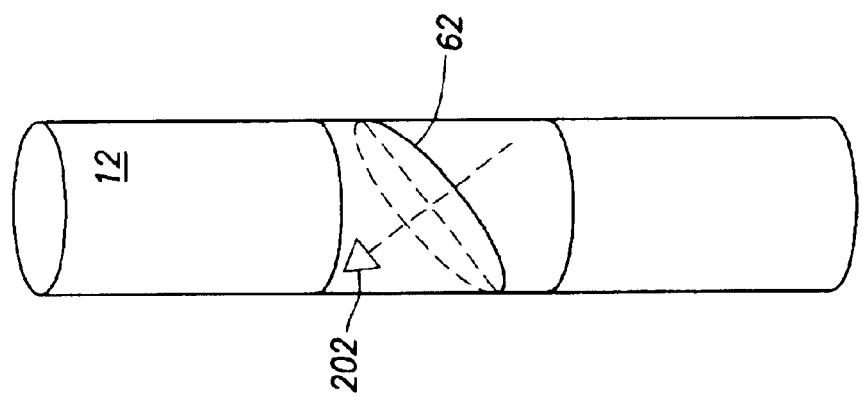
Figure 2A:
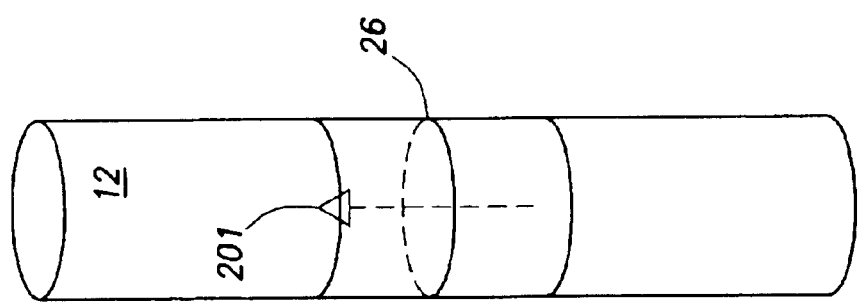

FIGS. 2a–2d show conventional antenna configurations on a wellbore tubular 12. The antennas are wrapped around the tubular and oriented in different directions. In FIG. 2a, an axial coil 26 is formed of one or more loops of wire where each loop of wire lies in a plane essentially perpendicular to the axis of the tubular. Each loop is essentially circular and centered around the tubular 12. The orientation of the coil is indicated by the dashed arrow 201, which is perpendicular to the plane of the coil and coincident with the tubular axis.

The well known "right hand rule" of electromagnetic theory for determining the direction of the magnetic field for a coil carrying a current "I" can be used to determine the direction of the arrow (i.e. up or down in the FIG. 2a). The purpose of such an axial antenna acting as a transmitter is to produce a magnetic field parallel to the tubular axis. Similarly, such an axial antenna acting as a receiver will detect a magnetic field parallel to the tubular axis.

In FIG. 2b, the antenna coil 62 is wrapped around the tubular 12, but the plane of an individual loop is not perpendicular to the axis of the tubular. The orientation of this coil is perpendicular to the plane of the loop, and illustrated by the arrow 202. This will be referred to as a diagonal coil, since the orientation 202 of the coil 62 is diagonal with respect to the tubular axis. In this case, each loop of the coil has an approximately elliptical shape centered on the tubular axis. The purpose of such a diagonal antenna coil acting as a transmitter is to produce a magnetic field diagonal to the tubular axis, with the magnetic field direction indicated by the dashed arrow 202. Similarly, such a diagonal antenna acting as a receiver will detect a magnetic field diagonal to the tubular axis, in the direction indicated by the dashed arrow 202.

In FIGS. 2c and 2d, two transverse antenna coils 210 are placed on opposite sides of the tubular 12 (FIG. 2d is a view rotated by 90° from FIG. 2c). Each transverse antenna 210 consists of one or more loops of wire where the plane of a loop is essentially parallel to the tubular axis and intersects the tubular axis. The orientation of a transverse coil is illustrated by the dashed arrows 203. If the two transverse loops are wired in series such that the direction of current is the same in both coils (i.e. counter-clockwise in FIG. 2c), then the two transverse coils have the same orientation. The purpose of such transverse antennas acting as a transmitter is to produce a magnetic field transverse or perpendicular to the tubular axis, with the magnetic field direction indicated by the dashed arrow 203. Similarly, such transverse antennas acting as a receiver will detect a magnetic field transverse to the tubular axis, in the direction indicated by the dashed arrow 203.

FIGS. 2a–2d show only a few turns of wire that comprises the coil, which is typical for resistivity measurements in the general frequency range of 100 kilohertz to a few megahertz. At these frequencies, 5 to 20 turns of wire can provide a sufficient level of efficiency for the resistivity measurement. If the antenna is used for electromagnetic telemetry, and has an operating frequency range of a few kilohertz to a few tens of kilohertz, then several hundred turns of wire may be needed to produce a sufficient level of efficiency. Otherwise, the antenna properties (such as physical dimensions) can be similar for the two situations. In the following discussion, it should be understood that it can be applied to either situation, with the number of turns possibly differing depending on use.

Figure 3:
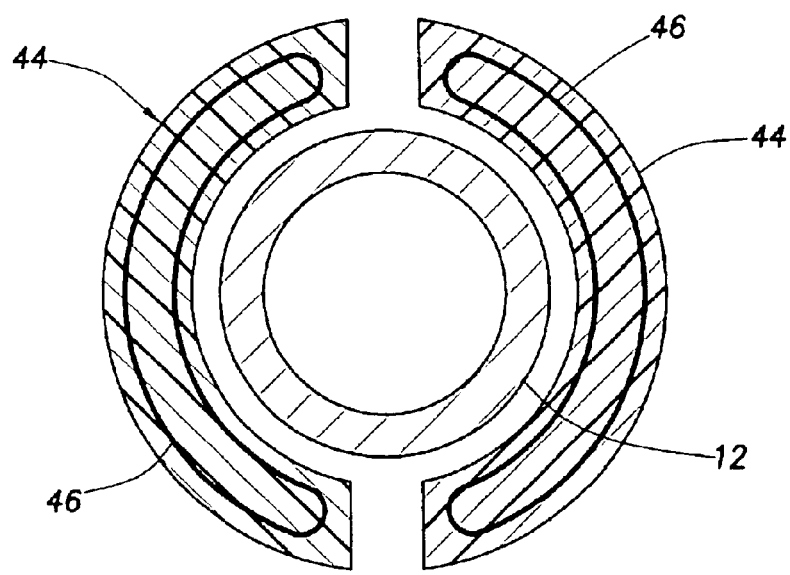
FIG. 3 illustrates a cross section of a tubular equipped with arcuate shaped members forming an antenna in accord with the invention.

FIG. 3 shows a cross-section of an embodiment of the invention. A tubular 12 is illustrated with two partial ring sections 44 disposed around the tubular exterior, each partial ring section 44 being easily placed around the tubular because each partial ring section 44 is independently formed with respect to the tubular 12. A "partial ring section" is an "arcuate shaped member" or "arcuate shaped section" in view of the fact that each partial ring section is curved in cross sectional shape. As a result, since the partial ring section is independently formed with respect to the tubular, each partial ring section/arcuate shaped member 44 can be manually and separately placed around the tubular 12 (this is a quick and easy procedure). The partial ring sections 44 may be formed using a non-conductive material such as fiberglass epoxy or other suitable thermoplastic compounds or resins.

General properties of these non-conductive materials include: a very high electrical resistivity to minimize electromagnetic losses, rigid mechanical properties to remain dimensionally stable under downhole pressures, a coefficient of thermal expansion similar to that of the tubular material to remain positional stable, and immunity to water penetration. For high frequency applications, the material is chosen with a low magnetic permeability—typically 1. However, for low frequency applications, antenna efficiency can be increased using a ferrite material with a large magnetic permeability (10–10,000). It should be understood that ferrite materials can be used in the partial ring sections, in addition to fiberglass epoxy, or in place of fiberglass epoxy or other thermoplastic material. Ferrite materials can have the other electrical properties (high resistivity) and mechanical and thermal properties listed above. Further details of the antenna construction are given below.

The term partial ring section could also comprise, for example, a half cylinder, or it could comprise two curved quad-sections. In fact, the term "partial ring section" could comprise any number of 'curved shaped' sections which, when juxtaposed together, would comprise or constitute a half cylinder. In addition, a partial ring section could also include a section which is not strictly either: a half-cylinder, or a ring, or any other member having a curved shape in cross section. As shown in FIG. 3, an antenna coil 46 is disposed within each of the partial ring sections 44.

Figure 4:
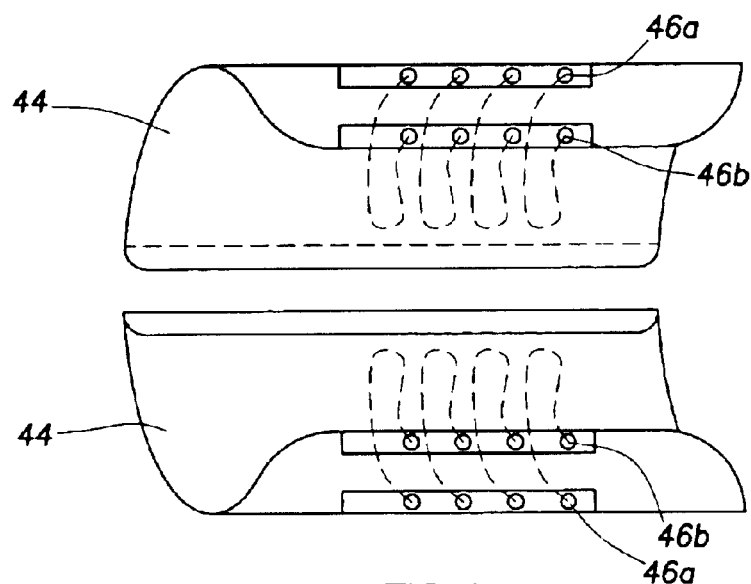
FIG. 4 illustrates the construction of a pair of 'partial ring sections' in accord with the invention.

FIG. 4 shows two partial ring sections 44 forming an antenna of the invention. Each partial ring section 44 includes an antenna coil 46, one section of the antenna 46 being the primary coil path 46a and the other section being the return coil path 46b. If the currents in the coils 46 are equal and flow in the same clockwise (or counter-clockwise) direction, this is equivalent to a single coil concentric with the tubular 12. Essentially, the magnetic fields from the two partial ring sections 44 add and result in an antenna with a predominantly axial magnetic dipole moment.

As can be observed from FIG. 4, each "half-cylinder" partial ring section 44 can be manually placed around a tubular (not shown), eliminating the need to wrap the antenna coil around the tubular as done with conventional antennas. Thus the antennas of the invention can be separately manufactured relative to the tubular 12. As a result, the antennas can be separately disposed on the tubular at the field prior to tripping the tubular into the well.

Figure 5:
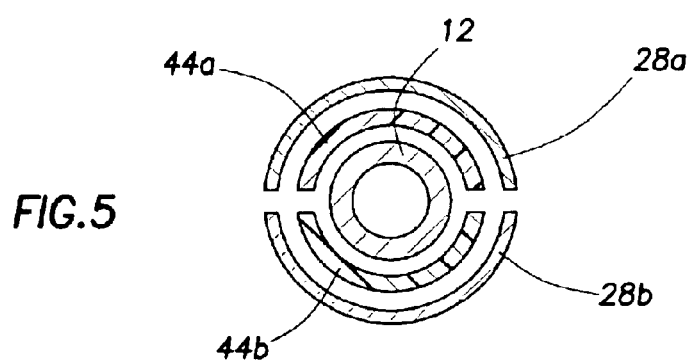
FIG. 5 illustrates a tubular with two 'partial ring sections' disposed on its exterior and juxtaposed together to form a ring-shaped loop antenna enclosed by a slotted shield in accord with the invention.

FIG. 5 shows a cross-sectional view of an antenna of the invention disposed on a tubular 12. A pair of partial ring sections 44 surround the tubular exterior; that is, a first partial ring section 44a has been manually placed around one-half of the tubular 12 and a second partial ring section 44b has been manually placed around the other one-half of the tubular 12. A shield 28 has also been placed around the two partial ring sections 44, the shield being in two parts: a first half-section 28a of shield 28 enclosing the first partial ring section 44a, and a second half-section 28b of shield 28 enclosing the second partial ring section 44b.

Figure 6:
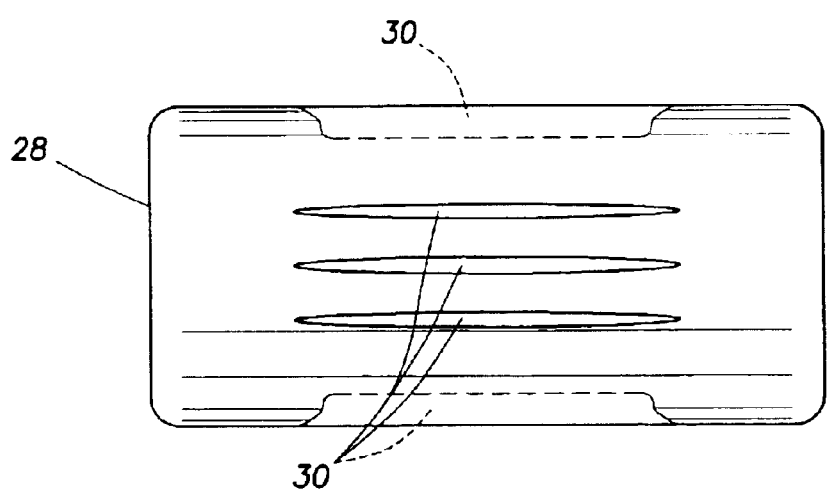
FIG. 6 illustrates a conventional shield adapted for disposal around the antennas of the invention.

FIG. 6 shows the shield 28, which is similar to conventional shields used on downhole tools. The shield 28 is typically metallic and includes a plurality of longitudinally oriented slots 30. Rubber is deposited inside each slot 30 in the shield to allow the electromagnetic energy from the energized antenna to emanate therefrom (in the case of a transmitter) or to be received therein (in the case of a receiver). It will be appreciated by those skilled in the art that any suitable technique for fastening or securing the shield 28 may be used to implement the invention (e.g. the shield may be bolted or clamped directly to the tubular). For example, a number of screws inserted through the shield and into the tubular can be used to secure the shield to the tubular.

Figure 7:
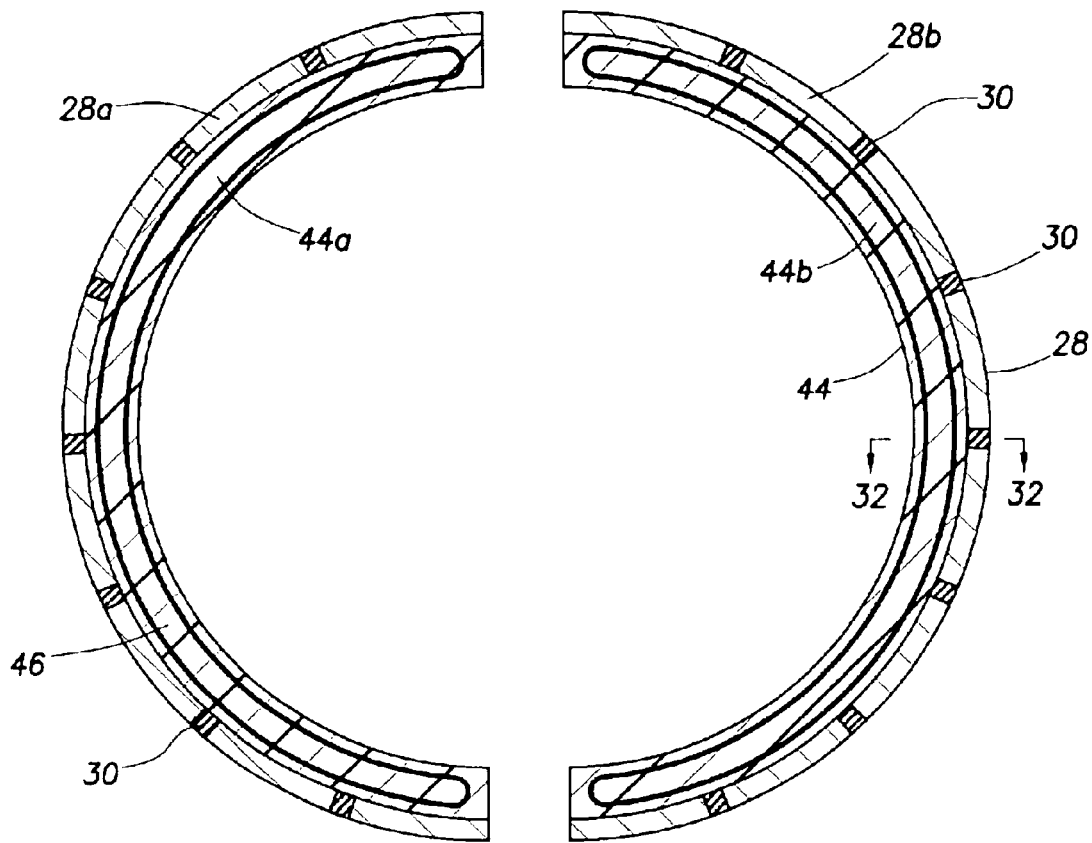
FIG. 7 illustrates a cross section of two partial ring sections with their respective shields in accord with the invention.
Figure 8:
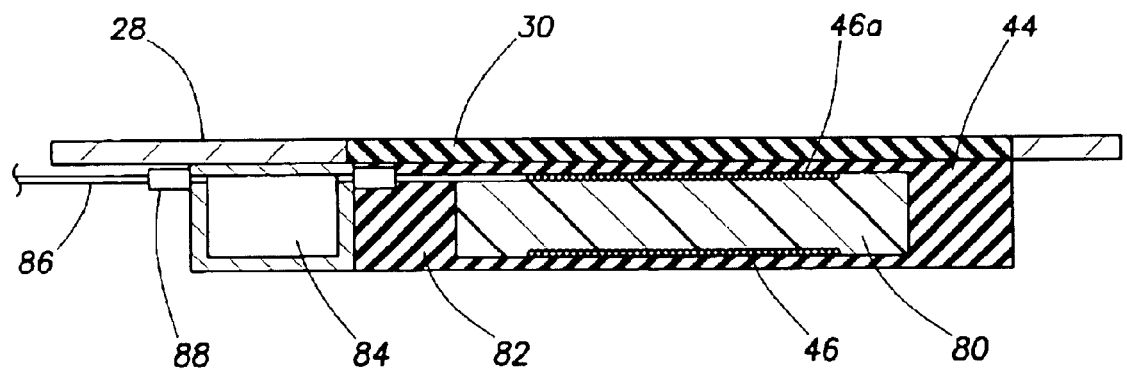
FIG. 8 illustrates a cross section through a partial ring section and shield of FIG. 7, taken along section lines 32—32 of FIG. 7.

FIG. 7 shows a cross-sectional view of two partial ring sections 44a/44b with their respective shields 28a/28b. A coil form 46 is disposed inside each partial ring section 44a/44b. FIG. 8 shows a cross-sectional view through a partial ring section 44 and shield 28 in FIG. 7, taken along section lines 32—32 of FIG. 7. In FIG. 8, the partial ring section 44 is shown covered by the shield 28, and the shield 28 includes the longitudinally oriented slots 30. The coil 46 in the partial ring section 44 is seated on a coil form/core 80 and a rubber over-mold 82 is illustrated which represents rubber molded over the coil 46. Coil form/core 80 could be made of fiberglass epoxy, a thermoplastic, and could also contain a ferrite material or be made entirely of a ferrite material. The primary coil path 46a of the coil 46 is coupled to a front-end electronics assembly 84, which is situated in a pressure vessel. Feed thru wires 86 are coupled to the front-end electronics assembly 84, and rubber 88 is molded over the feedthroughs 88 through which the wires 86 are coupled to the electronics assembly 84. As known in the art, the electronics assembly 84 is adapted to energize the antenna coil 46 with alternating current for transmitting electromagnetic energy or to receive signals responsive to the transmitted energy.

Figure 9:
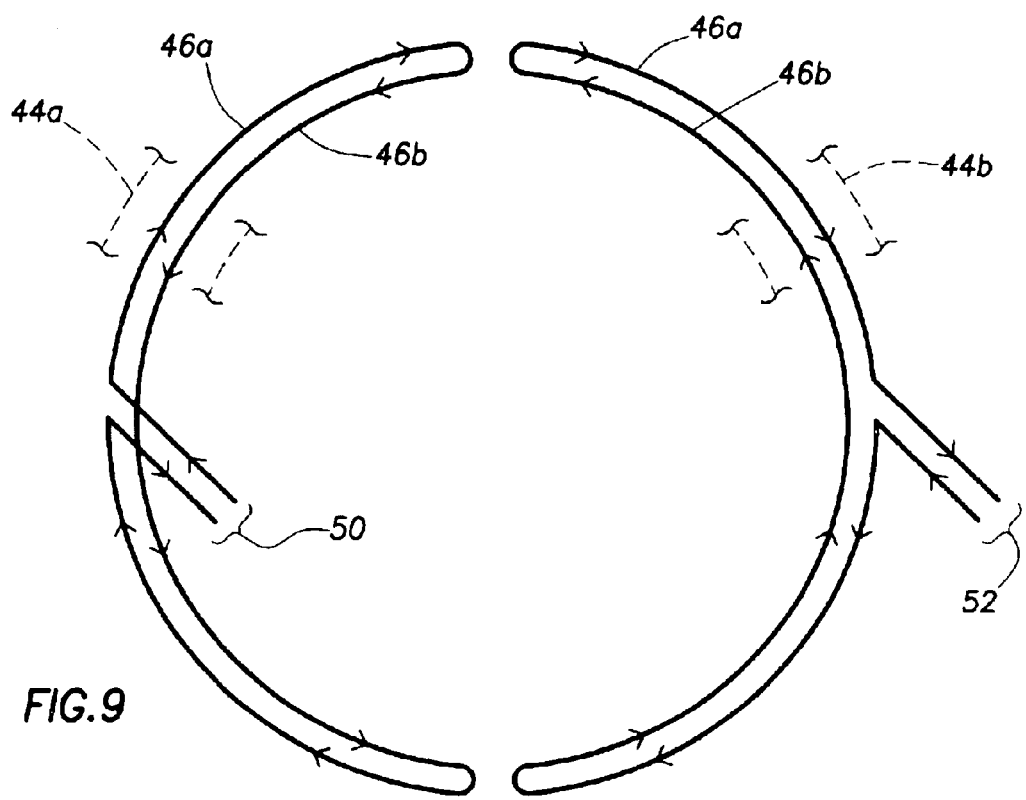
FIG. 9 illustrates the coil paths of the partial ring sections in accord with the invention.

FIG. 9 shows the primary coil path 46a and return coil path 46b in the first and second partial ring sections 44a and 44b of the antenna. Feed wires 50 are connected to the primary and return paths in the first partial ring section 44a, and feed wires 52 are connected to the primary and return paths in the second partial ring section 44b. The feed wires 50 and 52 should be connected in series or in parallel so that the currents flow in the directions indicated in FIG. 9. This causes the magnetic fields produced by the transmitter (for example) to be parallel. For the purposes of illustration, only one turn is shown. However, the coil could contain any number of turns depending on the operating frequency.

Figure 10:
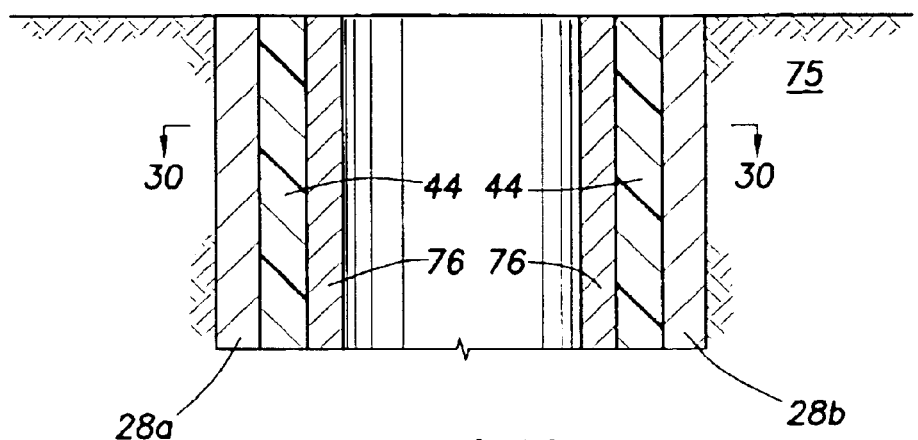
FIG. 10 illustrates a completion equipped with an antenna of the invention.

FIG. 10 shows a tubular 76, equipped with the partial ring sections 44 of the invention, forming a wellbore completion. Shield halves 28a and 28b are also placed around each partial ring section 44 to protect the partial ring sections. In actual use, the partial ring sections 44 and associated shields 28 may be placed around a plurality of sections of the tubular 76, as shown in FIG. 11.

Figure 1A:
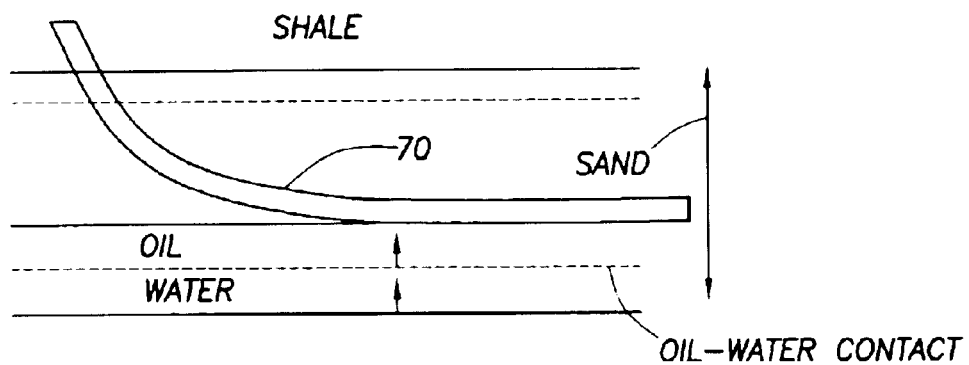
FIG. 1a illustrates a deviated wellbore in a formation having and an oil and water interface.
Figure 1B:
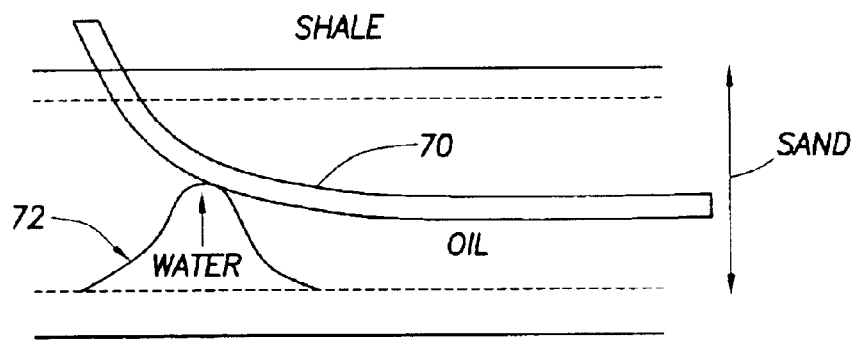
FIG. 1b illustrates the deviated wellbore of FIG. 1a with a water cone creating an adverse condition.
Figure 12:
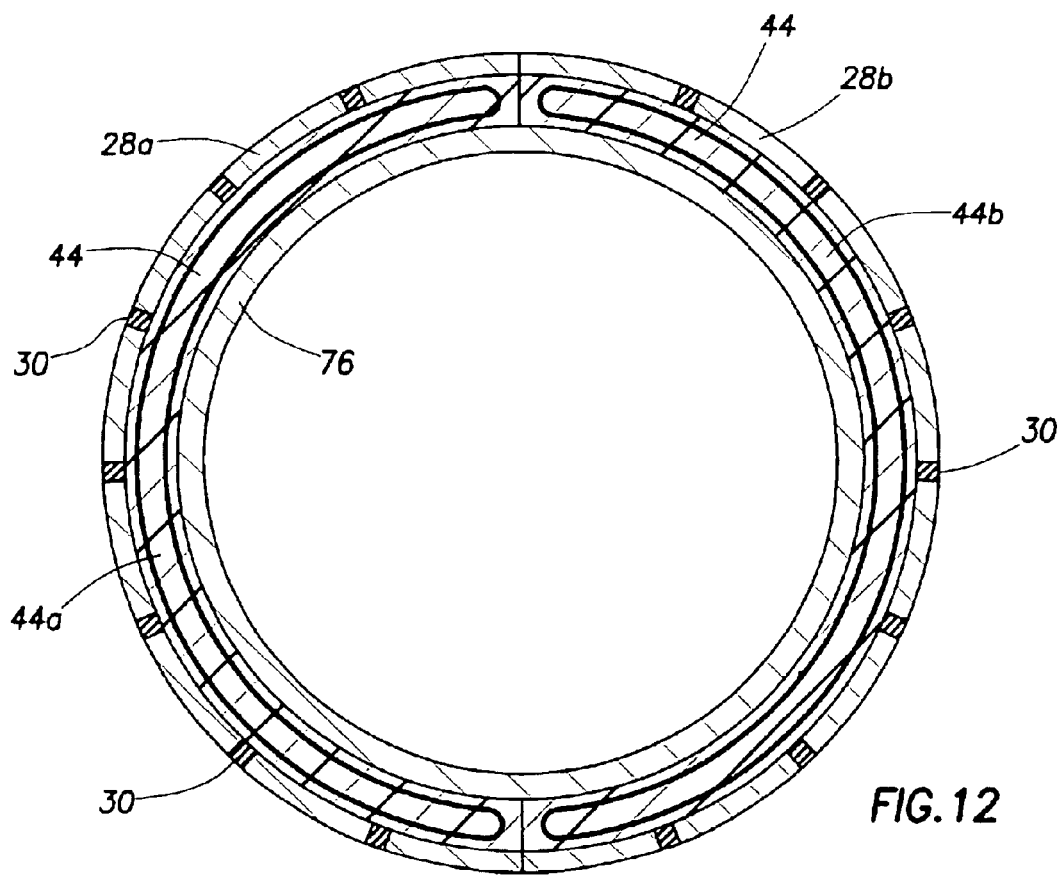
FIG. 12 illustrates a cross section through the tubular/antenna of FIG. 10 taken along section lines 30—30 of FIG. 10.
Figure 11:
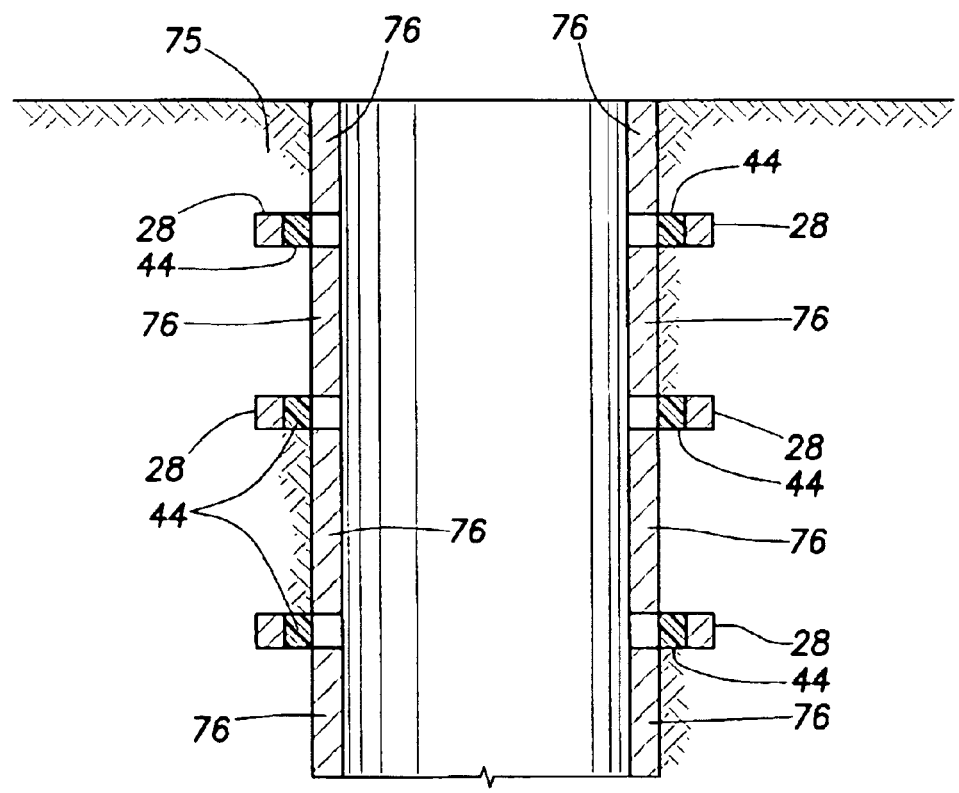
FIG. 11 illustrates another completion equipped with a plurality of antennas of the invention.

In FIG. 11, a plurality of 'partial ring sections 44/shield 28 embodiments' are placed along the outside of a corresponding plurality of tubular sections in the wellbore 75. If the adverse condition discussed above with reference to FIG. 1b exists along the wellbore 75 of FIG. 11 (where a water cone is approaching a section of the wellbore, and if unchecked, the water will flow in the wellbore instead of oil), the plurality of partial ring sections will detect that adverse condition. Downhole valves (not shown) can then be closed to prevent water from entering the wellbore in portions of the well adjacent to the water cone, as known in the art. To be more specific, the transmitting antennas represented by the partial ring sections 44 in FIG. 11 will transmit electromagnetic energy into the formation, and the receiving antennas represented by the corresponding partial ring sections 44 will receive the resulting electromagnetic signals, which may be transmitted uphole for analysis. In this way, an adverse condition will be detected and action can be taken to prevent water entry into the wellbore. FIG. 12 shows a cross-sectional view of the wellbore 75 in FIG. 10, taken along section lines 30—30 of FIG. 10.

Figure 13:
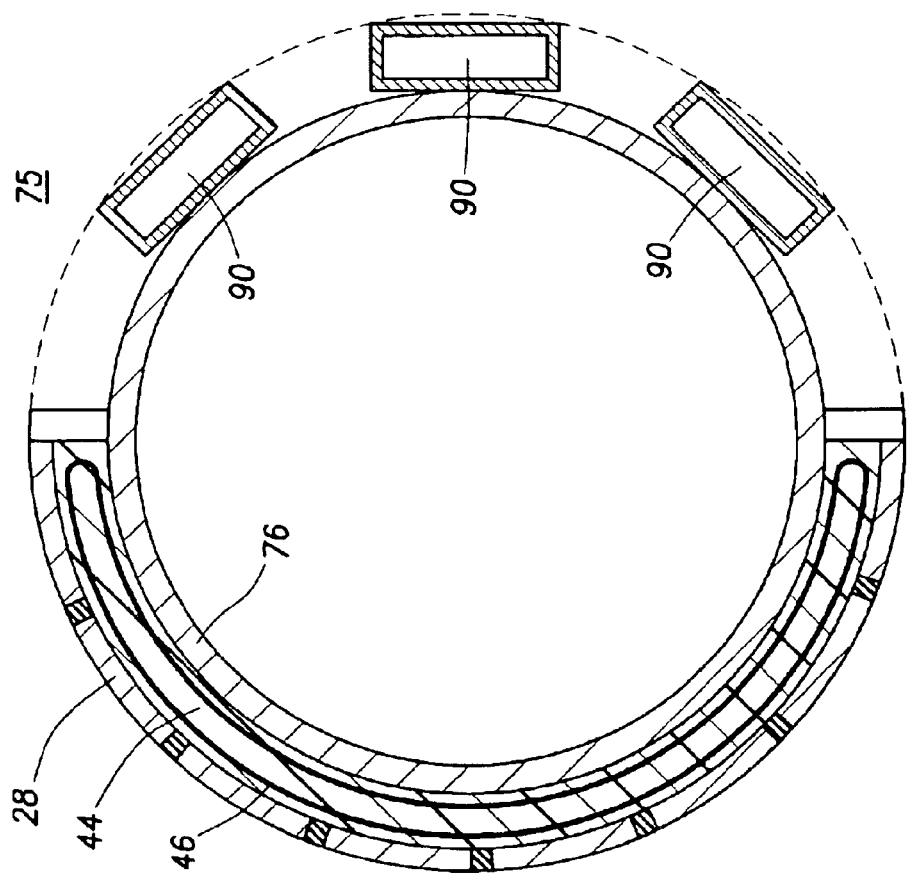
FIG. 13 illustrates an embodiment of the invention including a plurality of gravel tubes in accord with the invention.

Turning to FIG. 13, a slightly different embodiment of the invention is shown, wherein only one partial ring section 44, with a coil 46 embedded therein, is disposed over one-half of the tubular 12 in a wellbore and a shield 28 is disposed over the partial ring section 44. However, with respect to the other one-half of the tubular 12, gravel tubes 90 are longitudinally oriented along the tubular 12, suited for a gravel-pack completion operation as known in the art. Though the electromagnetic energy pattern for this embodiment may include some quadrupole radiation, it will nevertheless remain primarily magnetic dipole in nature and provide for resistivity inversion.

Figure 14A:
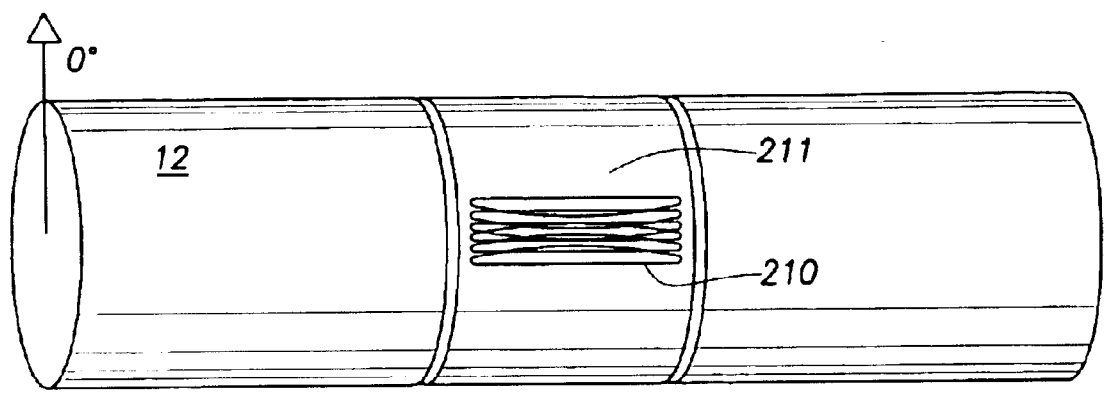
FIG. 14a illustrates a partial ring section including a transverse antenna configuration disposed on a tubular in accord with the invention.
Figure 14B:
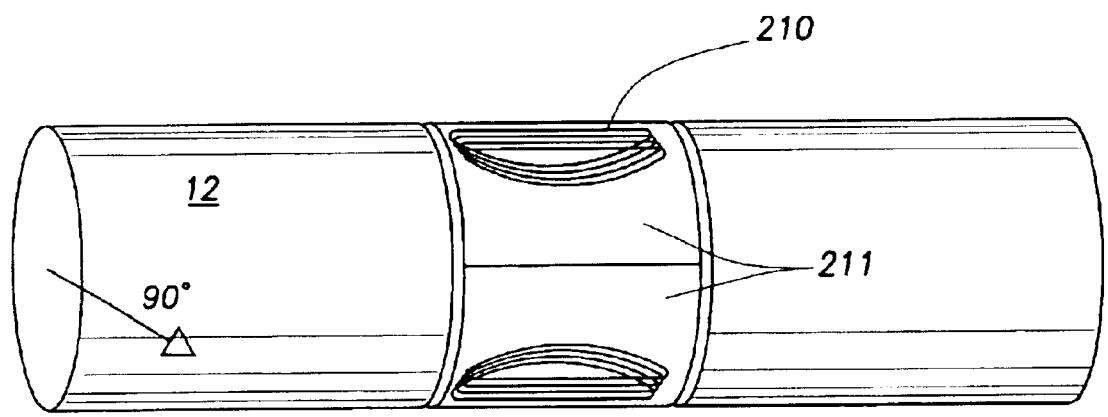
FIG. 14b illustrates the embodiment of FIG. 14a rotated by 90 degrees, showing two partial ring sections.
Figure 14C:
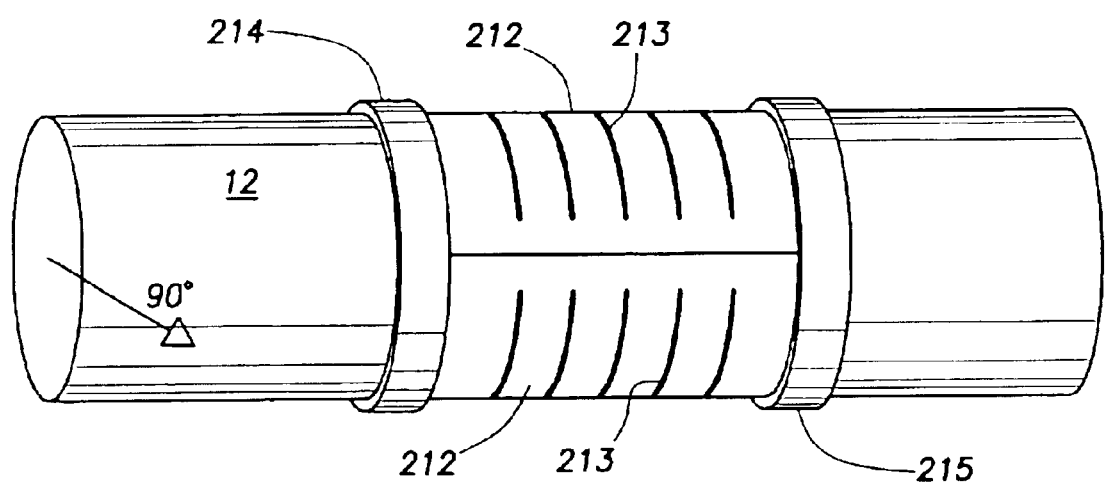
FIG. 14c illustrates the embodiments of FIGS. 14a and 14b with a shield structure disposed over the partial ring sections, showing the relationship between the azimuthal shield slots and the transverse coils.

In addition to axial and diagonal antenna coils, transverse antenna coils can also be implemented with the partial ring sections 44 of the invention as illustrated in FIGS. 14a–14c.

FIG. 14a shows a tubular 12 with a partial ring section 211 containing a transverse antenna coil 210, but without a shield attached to the tubular. The transverse antenna coil 210 is formed by one or more loops of wire where the wire loop lies in a plane essentially parallel to the axis of the tubular. In FIG. 14b, the embodiment of FIG. 14a is rotated by 90 degrees, and it shows two partial ring sections 211, each containing a transverse antenna coil 210. There are two transverse antenna coils 210, located on opposite sides of the tubular 12. In FIG. 14c, a metal shield has been installed over the partial ring sections 211. The viewpoint is the same in FIGS. 14b and 14c to illustrate the relationship between the slots in the shield 212 and the transverse antenna coils 210. The shield slots 213 are azimuthal and located over the transverse coils 210. The shield is comprised of two half shells 212, that are held in place with wear-bands 214 and 215.

Figure 15A:
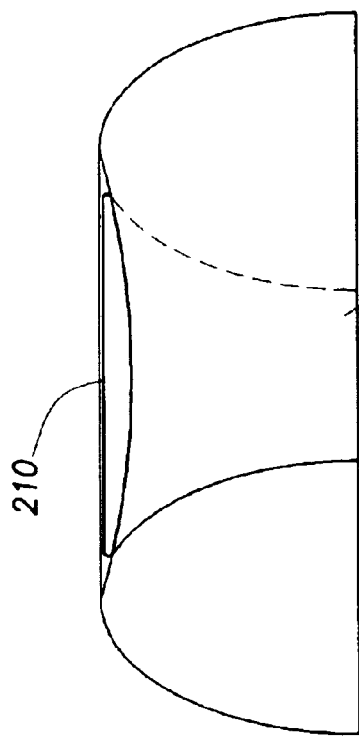
FIG. 15a illustrates a partial ring section with one loop of a transverse coil in accord with the invention.
Figure 15B:
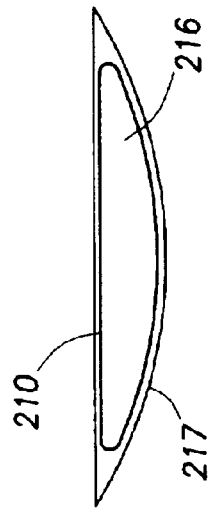
FIG. 15b is a magnified cross-sectional view of partial ring section of FIG. 15a at the location of the coil.

FIG. 15a shows a partial ring section 211 of the invention with one loop of a transverse coil 210. The partial ring section contains a coil form 216, which has a groove to accept the wire. A magnified cross-sectional view of the partial ring section 211 at the location of the coil 210 is shown in FIG. 15b. During the fabrication, the coil 210 is wrapped around the coil form 216, and then covered with a layer of rubber 217 to provide a waterproof barrier. Coil form 216 could be made of fiberglass epoxy, a thermoplastic, and could also contain a ferrite material or be made entirely of a ferrite material.

Figure 16:
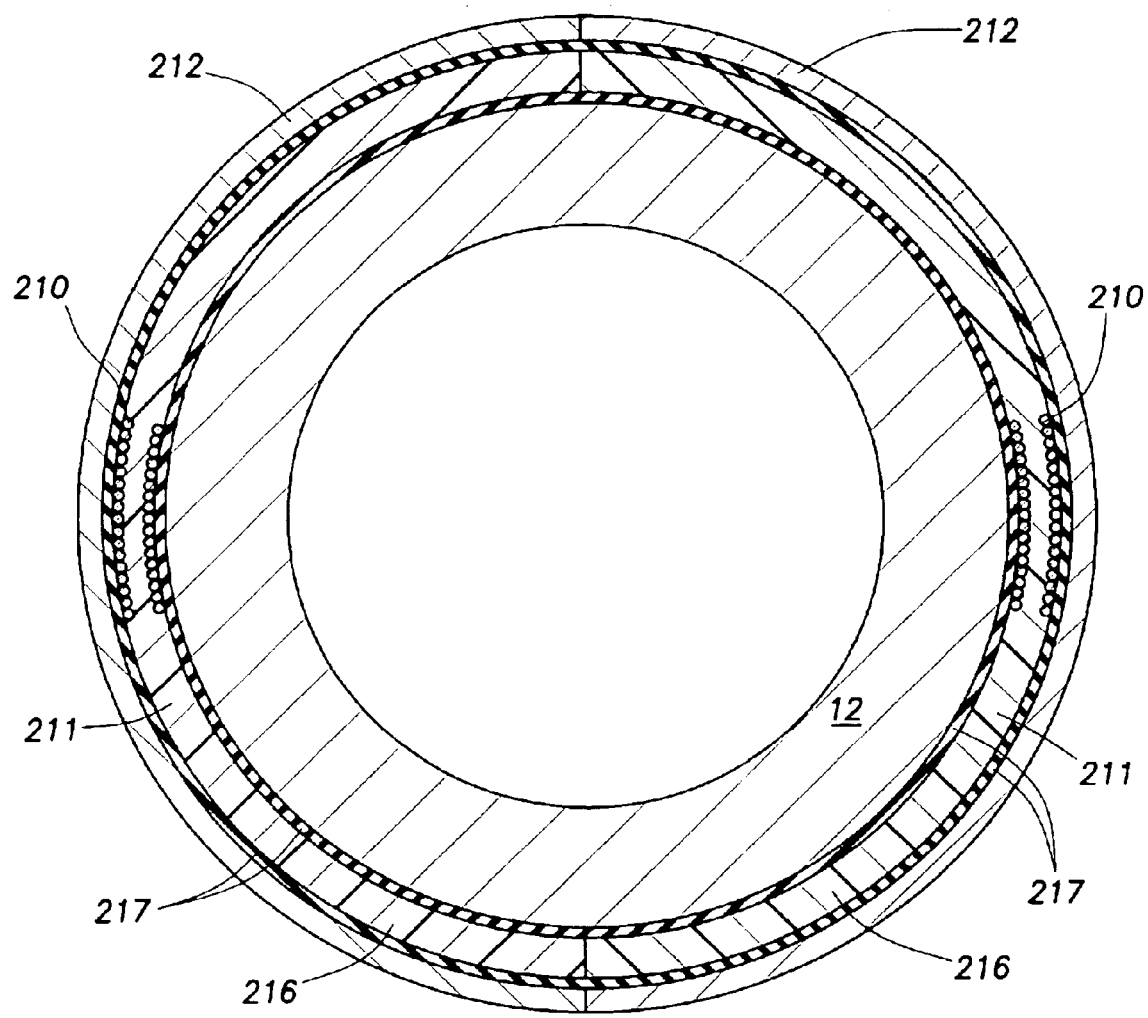
FIG. 16 illustrates a cross section of two partial ring sections disposed on a tubular, each section including a transverse coil in accord with the invention.

FIG. 16 is a cross-sectional view in a plane perpendicular to the axis of the tubular 12 and passing through the antenna. Two partial ring sections 211 are placed around the tubular 12. Each partial ring section 211 has transverse coil 210, wrapped on a coil form 216, and covered with rubber 217. Like the other coil forms of the invention, coil form 216 could be made of fiberglass epoxy, a thermoplastic, and could also contain a ferrite material or be made entirely of a ferrite material. Half shields 212 cover the partial ring sections 211 and protect them from damage during tripping into the well.

Figure 17:
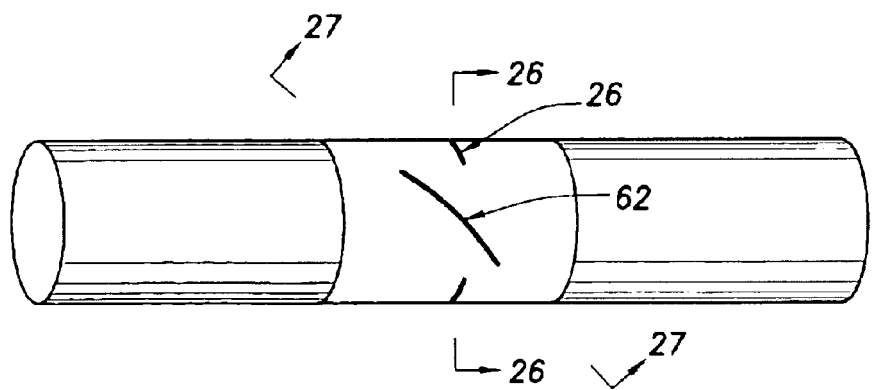
FIG. 17 illustrates a diagonal (as opposed to an axial) antenna coil configuration in combination with an axial antenna coil configuration in accord with the invention.

FIG. 17 shows another embodiment of the invention. In this embodiment, multiple coils (both diagonal and axial) are implemented. Two axial antenna coils 26 are located on opposite sides of the tubular. However, in addition to the two axial coils 26, two diagonal coils 62 are also located on opposite sides of the tubular, at 90 degrees with respect to the two axial coils 26.

Figure 19:
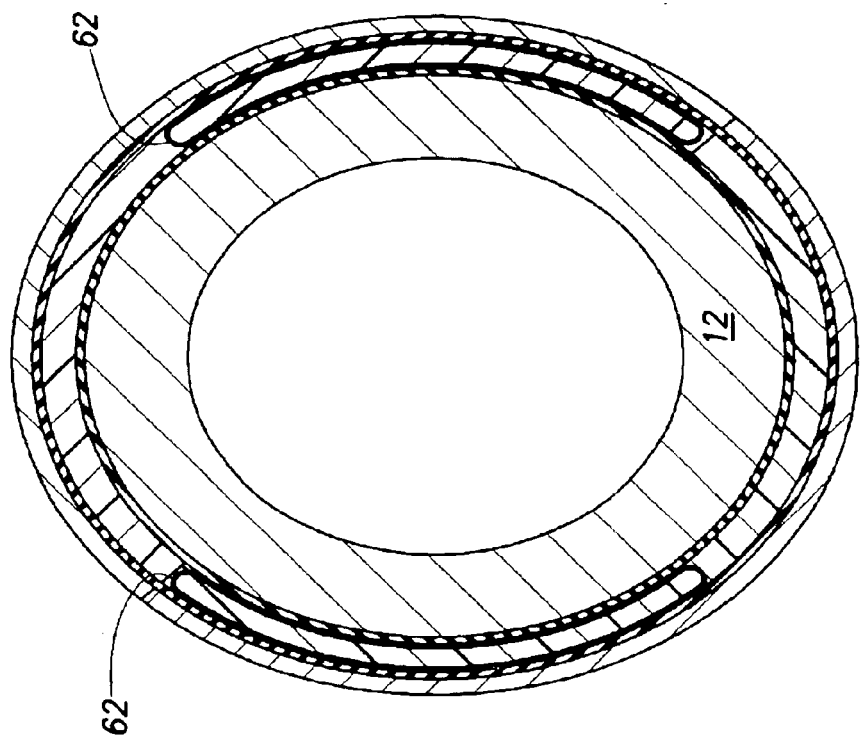
FIG. 19 illustrates a cross section of the antenna configuration of FIG. 17 taken along section lines 27—27 of FIG. 17.
Figure 18:
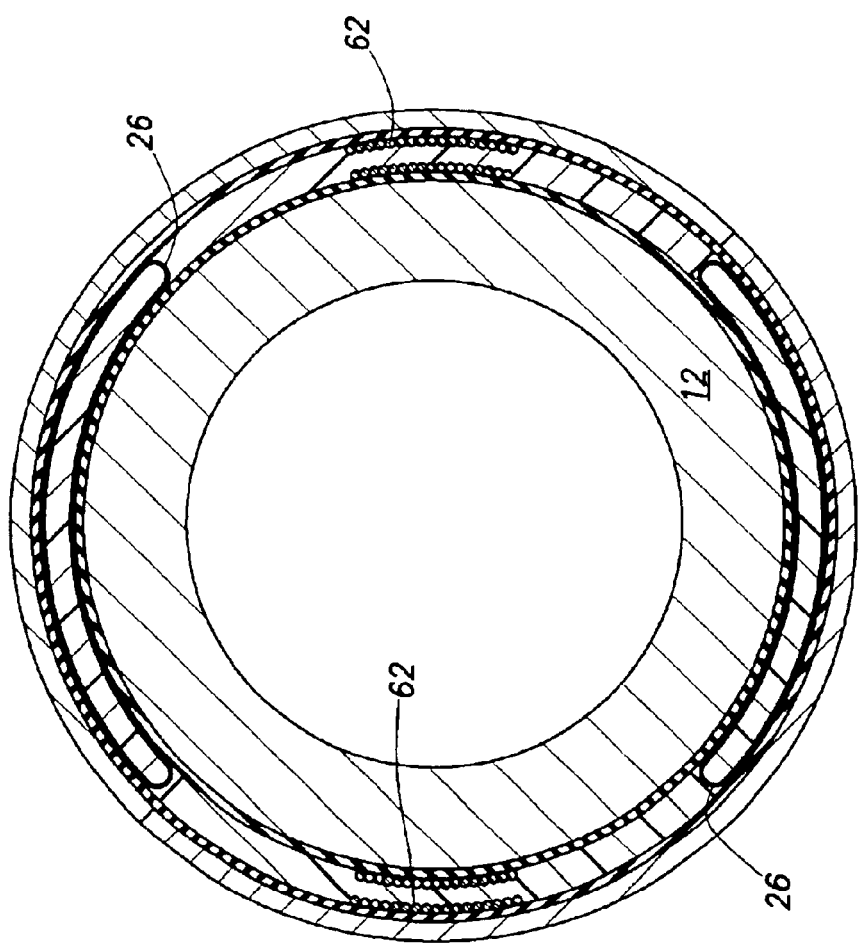
FIG. 18 illustrates a cross section of the antenna configuration of FIG. 17 taken along section lines 26—26 of FIG. 17.

FIG. 18 shows a cross-sectional view of the antenna embodiment in FIG. 17, taken along section lines 26—26 of FIG. 17. In FIG. 19, another sectional view of the antenna embodiment of FIG. 17 is illustrated, taken along section lines 27—27 of FIG. 17. Note that the tubular 12 and diagonal coils are elliptical in this sectional view. The relative areas and the number of turns for diagonal and axial coils can be optimized for directionality and efficiency. The shields (not shown) may also be aligned to assure azimuthal orientation of the slot pattern. Note also that the transverse coils of the invention could be used in place of the diagonal coils, with the relative areas and number of turns again optimized for efficiency and directivity.

Figure 20:
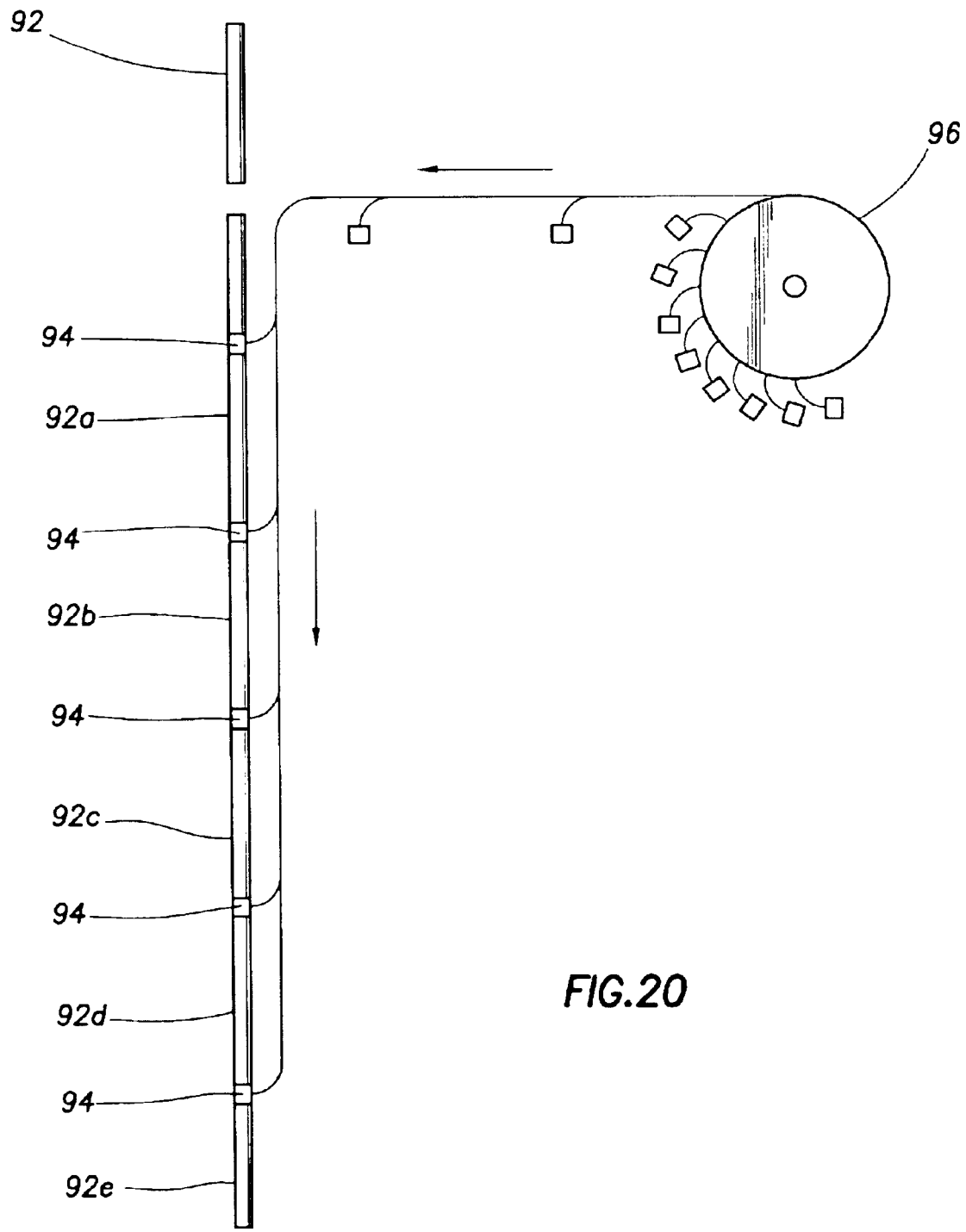
FIG. 20 illustrates a completion string and antenna system in accord with the invention.

FIG. 20 shows another embodiment of the invention. A section of a completion string 92 (or tubular 92) includes a plurality of individual sections 92a, 92b, 92c, 92d, and 92e, the plurality of individual sections 9a–92e being interleaved with a plurality of antennas 94 of the invention. The antennas 94 are being reeled from a spool of cable with antennas 96 and are being interconnected and interleaved between adjacent sections 92a–92e of the completion string 92. The antennas could be clamped on to the OD of the tubular (or affixed in any suitable manner known in the art), and can protrude into the annular space between the tubular and the formation. This annular space is filled with cement when the tubular is cemented into the formation. At a rig, individual sections of the completion 92a–92e are screwed together and tripped into the well. The spool 96 contains the cables and antennas of the invention. As each section 92a–92e of the completion is added, one or more antennas 94 are attached to the section, and the cables secured to the completion. There is a connector at the upper end of the cable.

For the purposes of this specification it will be clearly understood that the word "comprising" means "including but not limited to", and that the word "comprises" has a corresponding meaning.

While the invention has been described with respect to a limited number of embodiments, those skilled in the art will appreciate that other embodiments can be devised which do not depart from the scope of the invention as disclosed herein. For example, embodiments of the invention may be implemented without shields, or the shields may be formed of non-metallic or nonconductive materials.

What is claimed is:

1. A wellbore apparatus, comprising:
   an elongated tubular adapted for long-term disposal within said a wellbore;
   at least one arcuate shaped member adapted to function as an antenna and for disposal on said tubular, said arcuate shaped member being independently formed with respect to said tubular; and
   each at least one arcuate shaped member having a coil disposed therein.

2. The apparatus of claim 1, wherein said at least one arcuate shaped member includes at least two arcuate shaped members, one of said at least two arcuate shaped members being placed around a part of said tubular, the other of said at least two arcuate shaped members being placed around a second part of said tubular.

3. The apparatus of claim 2, wherein each of said at least two arcuate shaped members comprises a coil disposed therein, said coils functioning as an antenna for the apparatus.

4. The apparatus of claim 3, wherein said coils in said arcuate shaped members form an azimuthally disposed coil with respect to the axis of said tubular.

5. The apparatus of claim 3, wherein said coils in said arcuate shaped members form a diagonally disposed coil with respect to the axis of said tubular.

6. The apparatus of claim 3, wherein said coils in said arcuate shaped members form a transversely disposed coil with respect to the axis of said tubular.

7. The apparatus of claim 3, wherein said coils in said arcuate shaped members form azimuthally disposed and diagonally disposed coils with respect to the axis of said tubular.

8. The apparatus of claim 3, wherein said coils in said arcuate shaped members form azimuthally disposed and transversely disposed coils with respect to the axis of said tubular.

9. The apparatus of claim 3, wherein said coils in said arcuate shaped members form diagonally disposed and transversely disposed coils with respect to the axis of said tubular.

10. The apparatus of claim 1, wherein said at least one arcuate shaped member is formed from a nonconductive material.

11. The apparatus of claim 1, wherein said at least one arcuate shaped member includes a rubber layer disposed over said member.

12. The apparatus of claim 1, further comprising a shield disposed over said at least one arcuate shaped member.

13. The apparatus of claim 1, wherein said tubular is metallic.

14. The apparatus of claim 1, wherein said tubular is non-metallic.

15. The apparatus of claim 1, wherein each said coil is coupled with electronic means adapted to energize said coil or receive electromagnetic signals from said coil.

16. The apparatus of claim 1, wherein said tubular includes a plurality of arcuate shaped members placed thereon, each arcuate shaped member comprising a coil disposed therein and adapted to function as an antenna for the apparatus.

17. The apparatus of claim 16, wherein said coils in said arcuate shaped members form diagonally disposed, transversely disposed, and azimuthally disposed coils with respect to the axis of said tubular.

18. A method of deploying an antenna on a tubular adapted for long-term disposal in a wellbore, comprising:
   a) disposing an arcuate shaped member on the exterior of said tubular, said arcuate shaped member being independently formed with respect to said tubular and including a coil disposed therein; and
   b) coupling an electrical source to said coil.

19. The method of claim 18, wherein said coil is coupled with electronic means adapted to energize said coil or receive electromagnetic signals from said coil.

20. The method of claim 18, wherein said arcuate shaped member is formed from a nonconductive material.

21. The method of claim 18, further comprising disposing a shield over said arcuate shaped member.

22. The method of claim 18, wherein said tubular is metallic.

23. The method of claim 18, wherein said tubular is non-metallic.

24. The method of claim 18, step (a) further including disposing a second arcuate shaped member on the exterior of said tubular, said second arcuate shaped member being independently formed with respect to said tubular and including a coil disposed therein.

25. The method of claim 24, further comprising coupling an electrical source to said second arcuate shaped member.

26. A system for deployment of antennas within a wellbore, said antennas adapted to transmit or receive electromagnetic energy, comprising:

an electrical cable having said antennas coupled thereto;

a tubular adapted for disposal within said wellbore and to receive each of said antennas;

wherein each of said antennas comprises an arcuate shaped member independently formed with respect to said tubular; and each said arcuate shaped member having a coil disposed therein.

27. The system of claim 26, wherein said cable with said antennas is wound on a spool.

28. The system of claim 26, wherein one of said coils in one of said arcuate shaped members forms an azimuthally disposed coil with respect to the axis of said tubular when said antenna is disposed on said tubular.

29. The system of claim 26, wherein one of said coils in one of said arcuate shaped members forms a diagonally disposed coil with respect to the axis of said tubular when said antenna is disposed on said tubular.

30. Th system of claim 26, wherein one of said coils in one of said arcuate shaped members forms a transversely disposed coil with respect to the axis of said tubular when said antenna is disposed on said tubular.

31. The system of claim 26, wherein said arcuate shaped members are formed from a nonconductive material.

32. The system of claim 26, wherein each said arcuate shaped member includes a rubber layer disposed over said member.

33. The system of claim 26, farther comprising a shield adapted for disposal over at least one of said antennas.

34. The system of claim 26, wherein said tubular is metallic.

35. The system of claim 26, wherein said tubular is non-metallic.

36. The system of claim 26, wherein each said coil is coupled with electronic means adapted to energize said coil or receive electromagnetic signals from said coil.

37. The system of claim 26, further comprising a gravel tubs adapted for disposal on said tubular.

38. A method for deploying antennas within a wellbore, said antennas adapted to transmit or receive electromagnetic energy, comprising:

a) mounting each of said antennas along a tubular adapted for disposal within said wellbore, each said antenna being coupled to an electrical cable and comprising an arcuate shaped member independently formed with respect to said tubular, each said arcuate shaped member having a coil disposed therein; and b) disposing said tubular within said wellbore.

39. The method of claim 38, further comprising disposing a shield over at least one of said antennas.

40. The method of claim 38, wherein said tubular is metallic.

41. The method of claim 38, wherein said tubular is non-metallic.

42. The method of claim 38, further comprising disposing a gravel tube on said tubular prior to disposal of the tubular within said wellbore.

* * * * *